United States Patent
Chen et al.

(10) Patent No.: US 8,854,810 B2
(45) Date of Patent: Oct. 7, 2014

(54) PORTABLE COMPUTER HAVING REMOVABLE ACCESS PANEL

(75) Inventors: Kimbo Chen, Taipei (TW); Tony Tsai, Taipei (TW); Kevin L. Massaro, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 401 days.

(21) Appl. No.: 13/259,100

(22) PCT Filed: Oct. 30, 2009

(86) PCT No.: PCT/US2009/062737
§ 371 (c)(1),
(2), (4) Date: Sep. 22, 2011

(87) PCT Pub. No.: WO2011/053309
PCT Pub. Date: May 5, 2011

(65) Prior Publication Data
US 2012/0014058 A1    Jan. 19, 2012

(51) Int. Cl.
| | |
|---|---|
| *H05K 5/00* | (2006.01) |
| *H05K 7/00* | (2006.01) |
| *G11B 33/02* | (2006.01) |
| *A47G 1/10* | (2006.01) |
| *E04G 3/00* | (2006.01) |
| *E05C 5/02* | (2006.01) |
| *G06F 1/16* | (2006.01) |

(52) U.S. Cl.
CPC ............ *G06F 1/1658* (2013.01); *G06F 1/1635* (2013.01)
USPC ............ 361/679.55; 361/679.09; 361/679.39; 361/679.37; 369/75.21; 248/316.5; 248/292.14; 292/8; 292/341.17; 74/142

(58) Field of Classification Search
USPC ............................ 361/679.3, 679.01–679.09, 361/679.1–679.19, 679.31–679.45, 361/679.55–679.6, 724–747; 345/156, 157, 345/168, 169, 184; 369/282, 291, 253, 369/44.16, 75.5; 248/80–88, 155.1–155.5, 248/166–173, 180.1–186.2, 229.1–231.51, 248/271.4, 292.14, 316.1–316.8; 74/141–169, 113, 169.11–169.23; 292/1–62, 113, 169.11–169.23, 292/341.11–341.19
See application file for complete search history.

(56) References Cited

U.S. PATENT DOCUMENTS

| | | | |
|---|---|---|---|
| 6,535,378 B1 * | 3/2003 | Oguchi et al. ........... | 361/679.55 |
| 8,399,117 B2 * | 3/2013 | Hu et al. ................. | 429/96 |

(Continued)

FOREIGN PATENT DOCUMENTS

JP    2007172489 A    7/2007

OTHER PUBLICATIONS

PCT, "Notification of Transmittal of the International Search Report and the Written Opinion of the International Searching Authority, or the Declaration" for PCT/US2009/062737; Jul. 15, 2011; 9 pages.

*Primary Examiner* — Jerry Wu
(74) *Attorney, Agent, or Firm* — Romiwa C. Akpala (57) ABSTRACT

Embodiments of the present invention disclose a portable computer 100 having a removable access panel 108 for accessing data processing components stored within the portable computer. In one embodiment, the portable computer includes an upper housing 102 pivotably connected to a base housing 104. The base housing accommodates the data processing component and includes a top side that faces the upper housing and a bottom side opposite the top side. Furthermore, the access panel is formed to have substantially similar dimensions as the bottom side of the base housing, while also being configured to tool-lessly and releasably attach to said bottom side so as to expose or cover the removable component and an entire area of the bottom side of the base housing.

9 Claims, 8 Drawing Sheets

(56) References Cited

U.S. PATENT DOCUMENTS

| | | | |
|---|---|---|---|
| 2002/0044408 A1* | 4/2002 | DeLuga et al. | 361/680 |
| 2005/0052828 A1 | 3/2005 | Chang | |
| 2006/0133019 A1* | 6/2006 | Yamazaki et al. | 361/683 |
| 2006/0176659 A1* | 8/2006 | Sun et al. | 361/683 |
| 2007/0075613 A1 | 4/2007 | Mau | |

* cited by examiner

PORTABLE COMPUTER HAVING REMOVABLE ACCESS PANEL

BACKGROUND

Portable computers have become commonplace in today's mobile society and have seemingly supplanted traditional desktop computers as the preferred work and home computer. Laptop or notebook computers, netbooks, and tablet personal computers are a few examples of portable computers that permeate the current marketplace. These mobile workstations typically employ a clam-shell type design and come in a variety of sizes and features. However, one main drawback of these portable computers is that, due to the size and configuration of components, relatively little can be done to upgrade the overall computer from its original design. For example, servicing or upgrading the internal data processing components of the computer is often time-consuming for skilled computer technicians, and a daunting and cumbersome task for ordinary users.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIG. 1A is a three-dimensional perspective view of a portable computer according to an embodiment of the present invention, while

FIG. 2A is an illustrative view of the underneath side of the access panel and bottom side of the base housing, while

FIG. 5A is a flowchart illustrating the processing steps for removing the access panel from the base housing, while

DETAILED DESCRIPTION OF THE INVENTION

The following discussion is directed to various embodiments. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The clam-shell design of most portable computers typically comprise a computer chassis having a top display housing connected to a base housing along a horizontal axis via a hinge. The base housing generally includes a keyboard formed on the top surface, while internal data processing components, or components configured to process or store data, such as a central processing unit, a memory device, a hard disk drive, an expansion card, and a wireless module, are accommodated within the base housing and underneath the keyboard. Due to their location within the base housing, post-production access to the data processing components for replacing or upgrading requires opening or removing some portion of the base housing.

Embodiments of the present invention provide an access panel for a portable computer that is capable of instant and straightforward attachment and removal. In particular, a latch release and fixture system is provided that allows the access panel to be releasably attached to/from the bottom of the base housing tool-lessly, or without the use of tools (e.g. screws or screw driver) or other external machining part requiring manual operation. Accordingly, skilled and unskilled users alike will be capable of accessing internal data processing components of the portable computer with little to no lead time and with minimal effort.

Figure 1A:
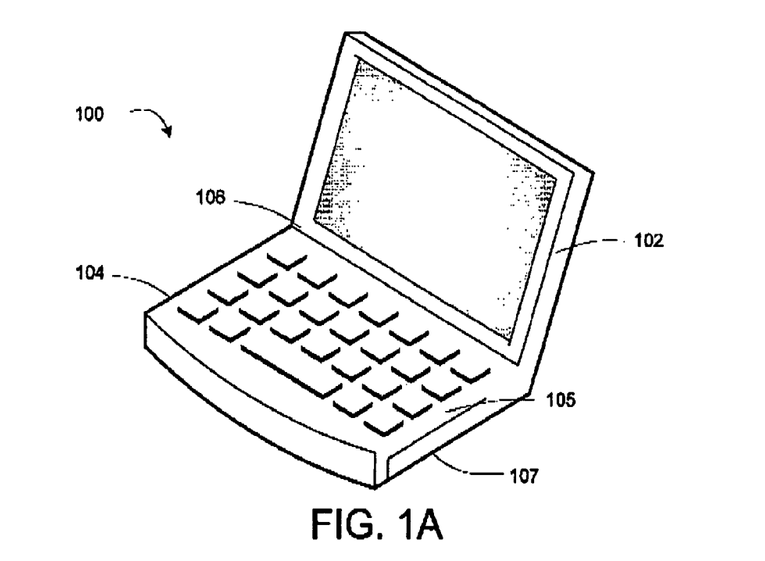
Figure 1B:
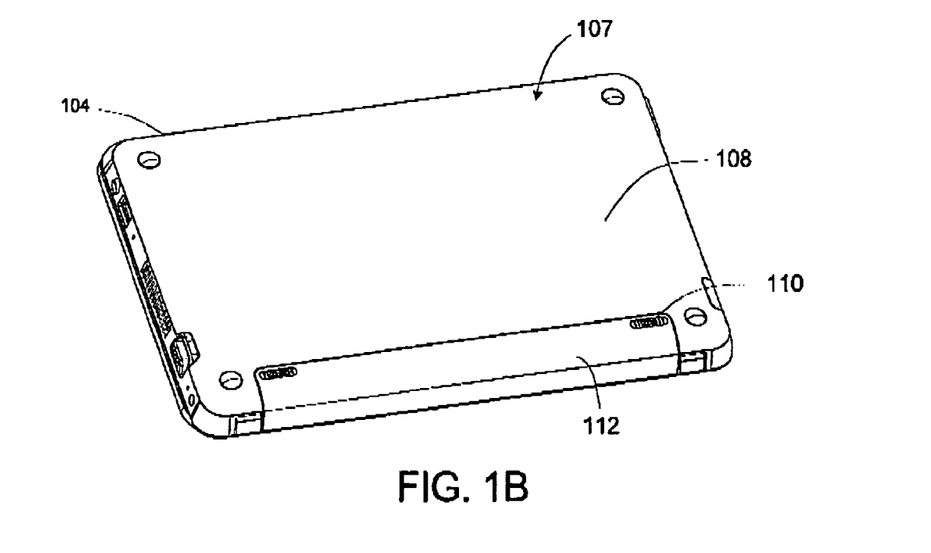
FIG. 1B is a three-dimensional perspective view of the bottom side of the base housing according to an embodiment of the present invention.

Referring now in more detail to the drawings in which like numerals identify corresponding parts throughout the views, FIG. 1A is a three-dimensional perspective view of a portable computer according to an embodiment of the present invention, while FIG. 1B is a three-dimensional perspective view of the bottom side of the base housing according to an embodiment of the present invention. Portable computer 100 includes an upper housing 102 and a base housing 104 connected to each other via a hinge 106 or other pivot mechanism. The upper housing 102 includes electrical wiring adapted to provide display to a user. As shown in FIG. 1A, the base housing 104 includes a top side and upper surface 105 having input interfaces, such as a keyboard and track pad, formed thereon, and an underneath or bottom side 107 opposite the top side 105.

FIG. 1B is a perspective view of an underneath or bottom side of the base housing according to an embodiment of the present invention. As shown here, a bottom side 107 of the base housing 104 includes a battery 112, and an access panel 108. Battery 112 may represent a lithium ion battery cell, or any other removable power source for a portable computer, and includes a battery release structure having two release mechanisms 110 for selectively releasing the battery 112 from the base housing 104 of the portable computer. In one embodiment, the battery 112 is released from the base housing 104 by sliding, or by applying inward-outward pressure onto, the two release mechanisms 110, thereby disengaging the battery latching mechanism from the base housing 104. However, the battery release mechanism is not limited to the embodiment described above, and any known battery fixture and release mechanism may be employed.

Figure 2A:
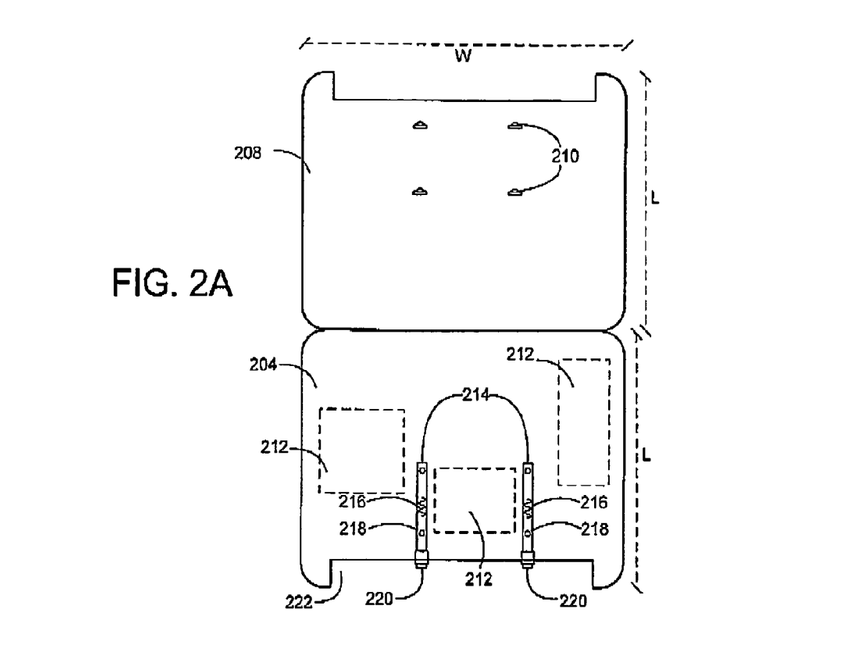
Figure 2B:
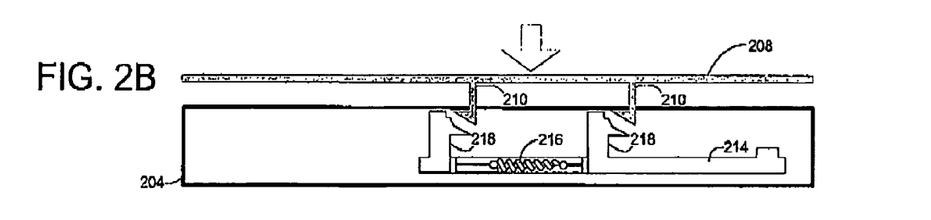
FIGS. 2B-2D are side views illustrating the automatic latching mechanism according to an embodiment of the present invention.

FIG. 2A is a perceptive view of the bottom side of the base housing 204 and an underneath area of the access panel 208 according to an embodiment of the present invention. In an exemplary embodiment, the base housing 204 includes multiple processing components 212, a battery recess area 222, and two latch members 214, with each latch member having an inner spring 216 and two vertically-aligned clamp portions 218. Furthermore, a portion 220 (hereinafter "latch release portion") of the latch member 214 proximate to the battery recess area 222 may be used as a means for activating the release mechanism of the latch members 214. The latch release portions 220 should be exposed from base housing so as to allow quick activation by a user, and may slightly protrude from the base housing 204 as shown in FIG. 2B. Alternatively, the latch release portions 220 may lie somewhat concealed within the base housing 204. A more detailed explanation of the latching mechanism will be described in further detail below.

In addition, and according to one embodiment of the present invention, access panel 208 includes a hook structure comprising of four small flexible tabs 210 that correspond to positions of the four latch clamp portions 218. Tabs 210 are adapted to affix the access panel 208 with the base housing 204 as will be described with reference to FIGS. 2B-2D. In one embodiment, tabs 210 of the access panel 208 are formed around the hard drive of the portable computer in order provide better protection and tolerance control. As shown in the present embodiment, the access panel 208 is formed to have dimensions L and W substantially similar to the dimensions L and W of the base housing 204 so as to sufficiently span and cover the entire bottom side of the base housing 204. In particular, the access panel 208 is formed to have a length and width that essentially corresponds to the length and width of the base housing 204. Though the referenced dimensions are not required to be an exact and congruent match, the dimensions of the access panel should be of sufficient size, and of substantial similarity, so as to cover all internal data processing components of the base housing. Accordingly, embodiments of the present invention help to provide a single panel that consolidates all internal component servicing or upgrading needs by allowing instant and unencumbered access to an entire underneath area of the base housing.

Figure 2C:
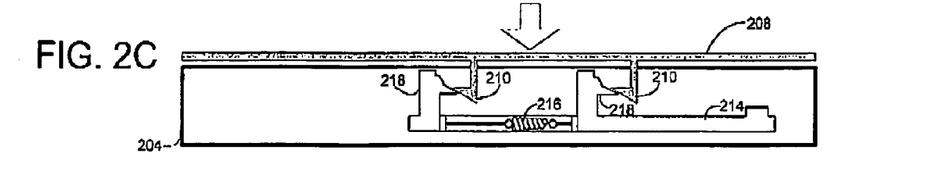
Figure 2D:
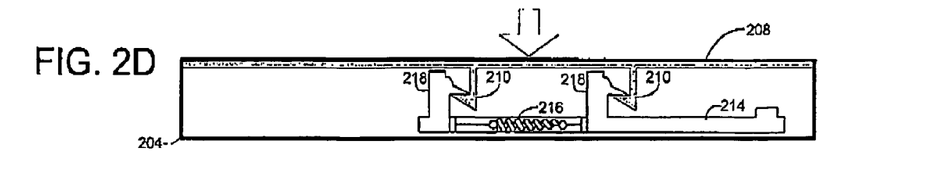

FIGS. 2B-2D illustrate side views of the automatic latching mechanism according to an embodiment of the present invention. In particular, inward pressure indicated by the directional arrow is applied to a top surface of the access panel 208 as shown in FIG. 2B. When the tab portions 210, which are positioned on the underside of the access panel 208, engage with the latch clamp portions 218 of the base housing 204, the latch spring 216 automatically compresses and pushes the latch member 214 into an open position for receiving the access panel 208 as shown in FIG. 2C. Once the tab portions 210 have completely engaged the clamp portions 218, the inner spring 216 automatically returns to its original extended position so as to lock the clamp 218 and tab portions 210 in a fixed position, or closed state as shown in FIG. 2D. As such, the access panel 208 is capable of being securely fixed to the base housing 204 automatically and tool-lessly, i.e. without the use of laborious screwing and unscrewing.

Figure 3A:
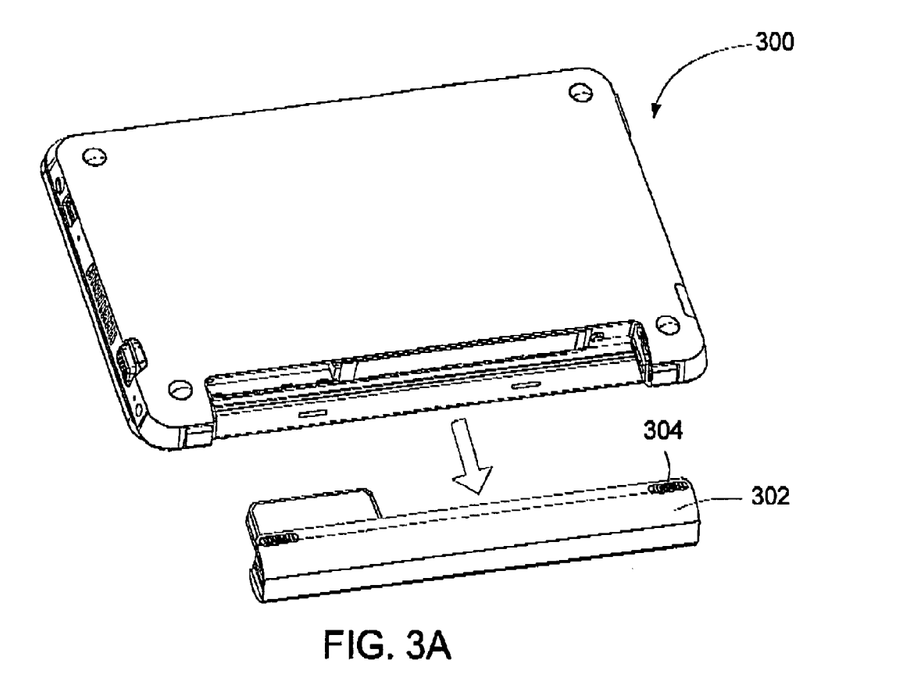
FIGS. 3A-3E illustrate a process for removing the access panel from the base housing according to an embodiment of the present invention.

FIGS. 3A-3E illustrate a process for removing the access panel from the housing according to an embodiment of the present invention. As shown in FIG. 3A, the battery 302 is removed from the base housing 300 via the battery latch mechanism 304. The arrow of FIG. 3A represents the movement of battery 302 away from the base housing 300 so as to expose the latch release portions 306 of the latch members. By concealing latch release portions 306 of the latch member within the battery recess area, the latch mechanism is protected from normal everyday use and accidental engagement.

Figure 3B:
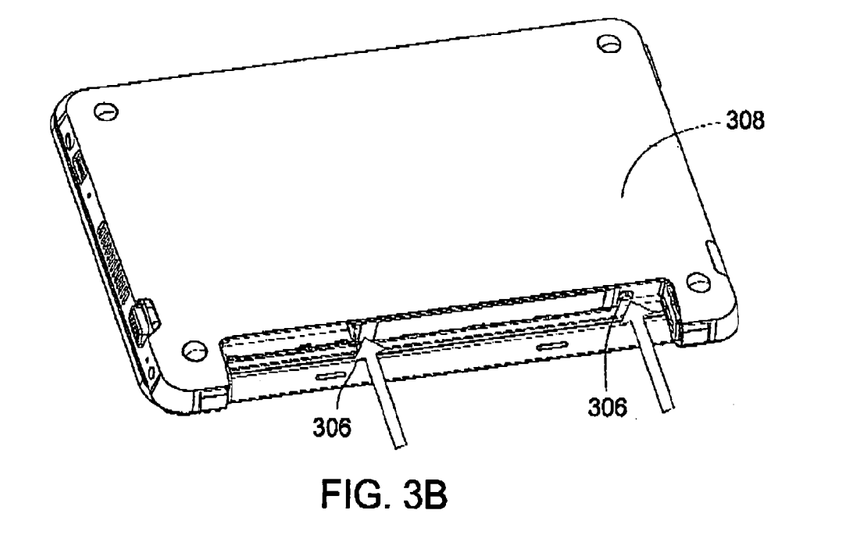

FIG. 3B depicts an external force being applied to the latch release portion 306 of the latch member according to exemplary embodiment of the present invention. As shown here, two direction arrows represent forces applied by a user attempting to remove the access panel 308 from the base housing. In one embodiment, the latch mechanism 308 comprises of two latch members that extend perpendicularly from the battery recess to a center of area of the base housing. As discussed above, each latch member includes at least one clamp configured to engage with an underside of the access panel, and an inner spring for applying pressure to the clamp. In particular, when the latch release portion 306 is pressed by a user, the spring compresses so as to disengage the clamp with the hook portion of the access panel, thus placing the latch mechanism in an open state for removing the access panel.

Figure 3C:
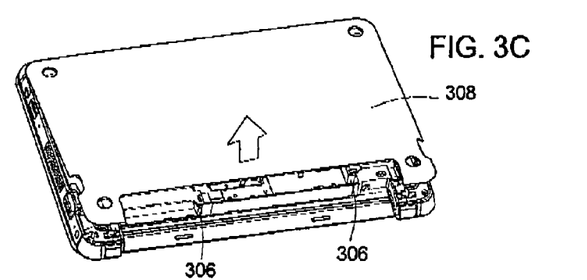
Figure 3D:
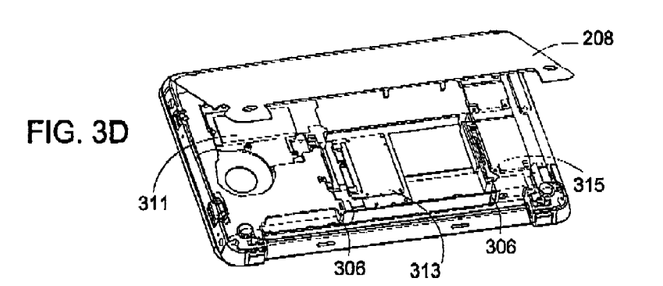
Figure 3E:
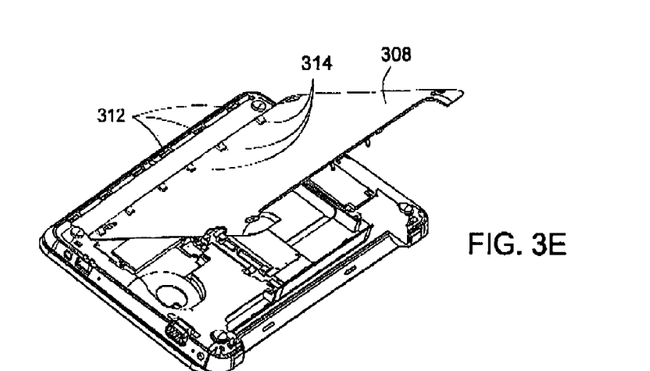

FIGS. 3C and 3D illustrate the access panel 308 being lifted upwards and away from the base housing in order to expose the removable data processing components 311, 313, and 315. As shown in FIG. 3D, examples of the removable components may include, but are not limited to central processing unit 311, hard disk drive 313, and random access memory module 315. Thereafter, a plurality of front tabs 314 of the access panel 308 are disengaged from the tab holes 312 of the base housing 302, thereby allowing the access panel 308 to be completely separated and removed from the base housing 302 as shown in FIG. 3E.

Figure 4A:
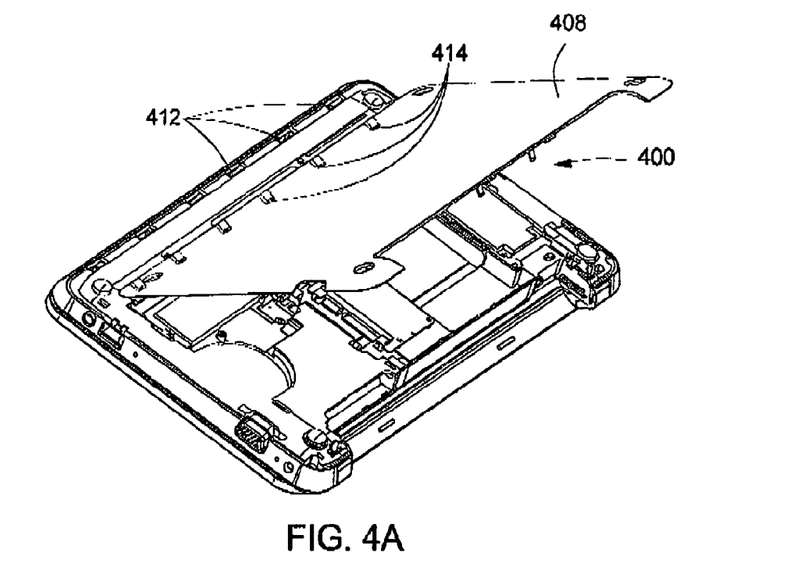
FIGS. 4A-4F illustrate a process for attaching the access panel to the base housing according to an according to an embodiment of the present invention.
Figure 4B:
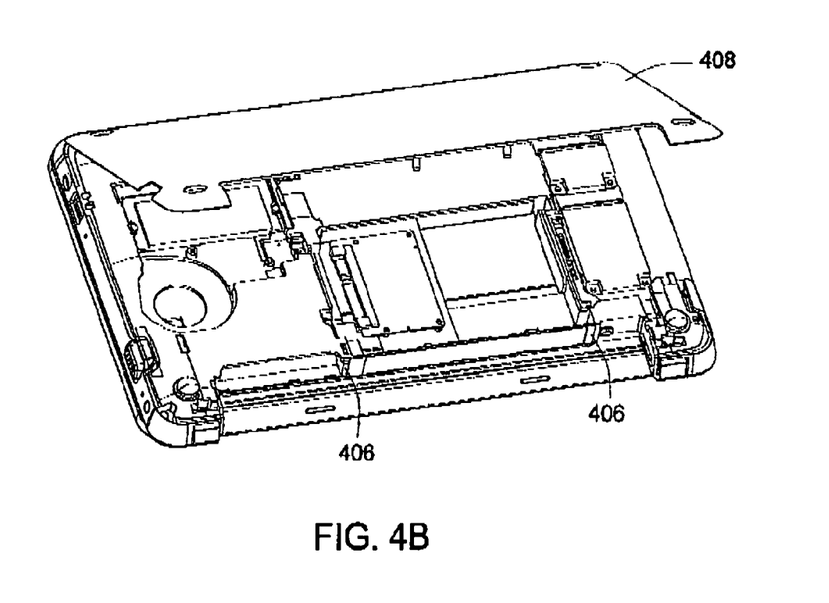
Figure 4C:
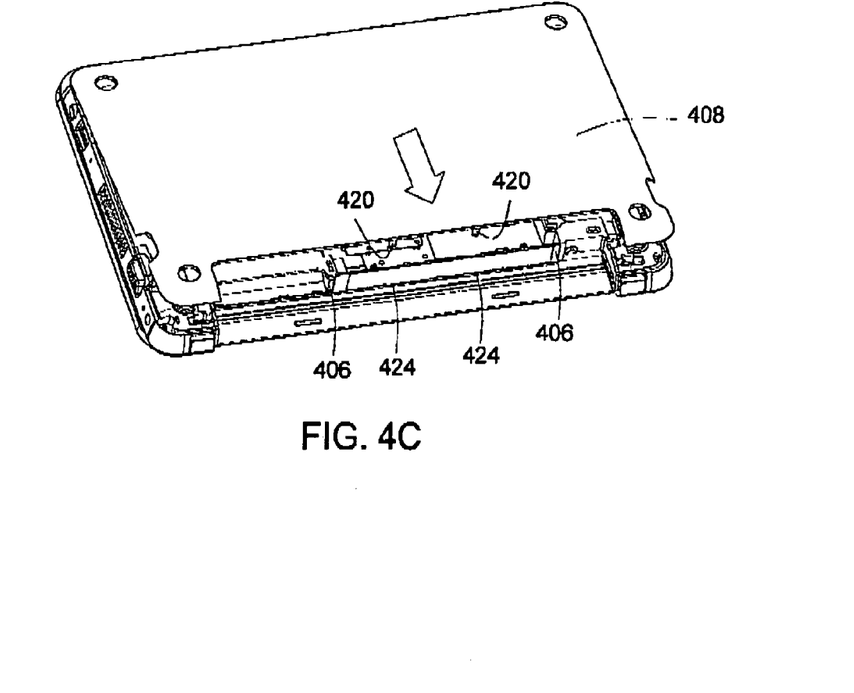
Figure 4D:
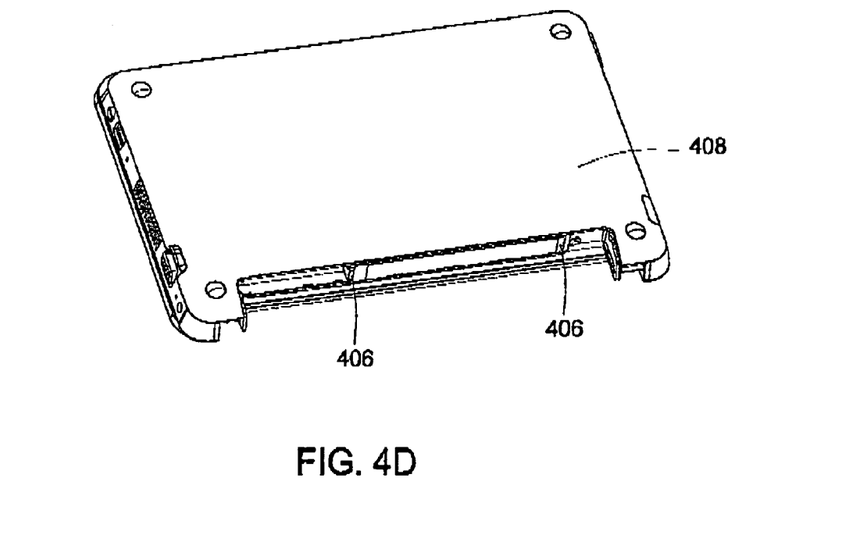

Referring now to FIGS. 4A-4E, these figures illustrate the process for attaching the access panel to the base housing according to an embodiment of the present invention. According to the example shown in FIG. 4A, the front tabs 414 of the access panel 408 are aligned with the tab holes 412 of the base housing 400. FIG. 4B depicts the front tabs 414 being inserted into tab holes 412. The coupling of the front tabs 414 of the access panel with the tab holes 412 of the base housing serves to provide a secure engaging structure for the front area of the base housing and access panel, as well as positioning alignment for the clamp portions of the latch members with the hook portions of the access panel. Next, the rear side of the access panel is lowered onto the rear side of the base housing as shown in FIG. 4C. In this illustrative example, rear tabs 420 of the access panel are aligned with secondary tab holes 424 of the base housing. Once the access panel 408 has been lowered and properly aligned as shown in FIG. 4D, the service door latching mechanism 406, and particularly the clamps thereof, are configured to automatically engage with the hook portions located at corresponding positions at an underside area of the access panel 408 as shown in FIGS. 2A-2D.

Figure 4E:
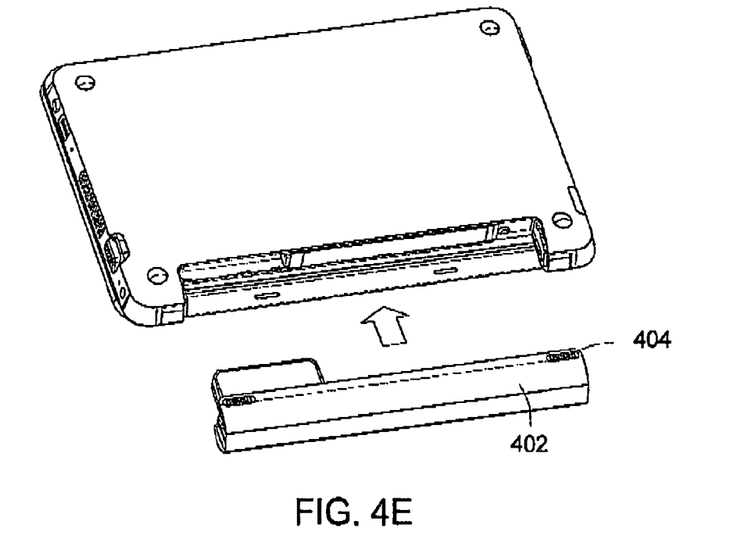
Figure 4F:
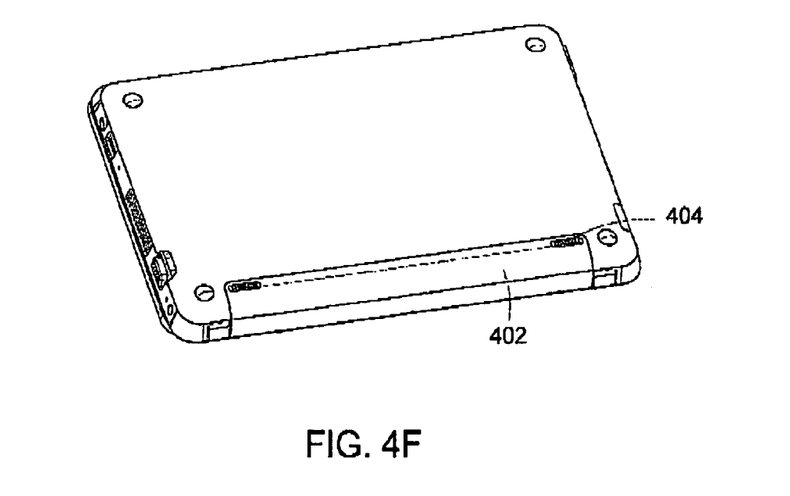

FIG. 4E depicts the installation of the battery 402 within the battery recess area 401 of the base housing 400 so as to cover and protect the latch release portions of the latch member 406. When the battery has been positioned correctly within the battery recess area 401, the battery latch 404 is configured to automatically engage with the base housing as shown in FIG. 4F.

Figure 5A:
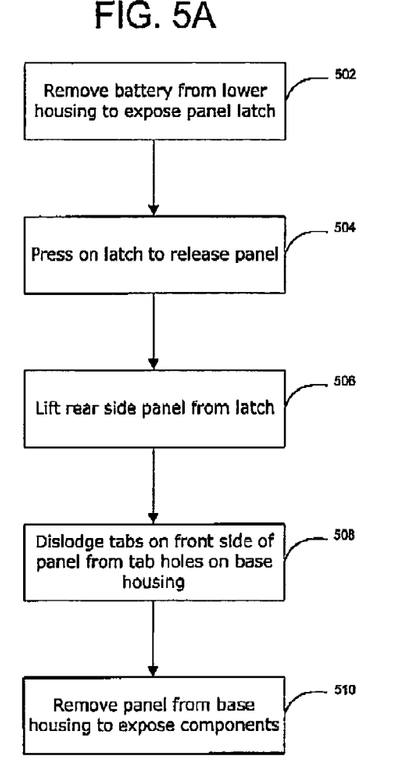
Figure 5B:
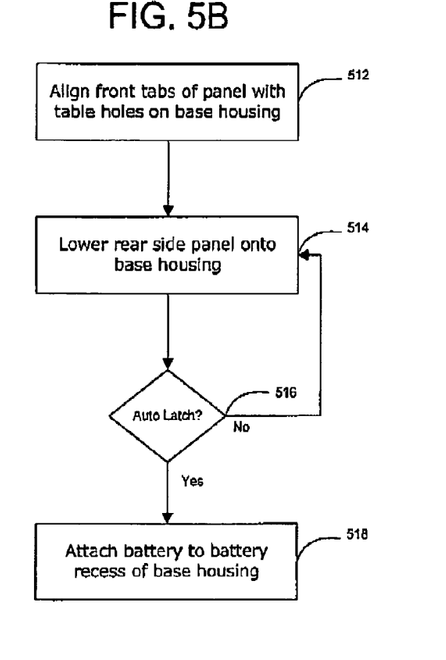
FIG. 5B is a flowchart illustrating the processing steps for attaching the access panel to the base housing according to an embodiment of the present invention.

FIG. 5A is a flowchart illustrating the processing steps for removing the access panel from the base housing, while FIG. 5B is a flowchart illustrating the processing steps for attaching the access panel to the base housing according to an embodiment of the present invention. In step 502, a user removes the battery from the base housing so as to expose latch release portions of the latch members of the base housing. Next, in step 504, the user applies inward pressure onto the latch release portions of the latch members so that the inner spring compresses and disengages the latch clamp portion from the hook portion of the access panel. Such manipulation places the latch member in an open state, thereby allowing the access panel to be easily lifted and removed from the base housing. The latch mechanism remains in an open state until the pressure is released, at which point the spring reverts back to its original, extended position. In step 506, the rear side of the access panel is lifted from the latch member and the rear side of the base housing. The front tabs of the access panel are dislodged from the base housing in step 508, and in step 510, the access panel is completely removed from the base housing, thus exposing the removable data processing components of the portable computer.

Attachment of the access panel with the base housing of the portable computer is accomplished in a similar fashion as detailed in FIG. 5D. In step 512, the front tabs of the access panel are aligned with the front tabs of the base housing. In step 514, the rear side of the panel is lowered onto the base housing. In an exemplary embodiment, when the access panel is properly aligned and positioned over the base housing, the clamp portions of the base housing are configured to automatically engage the hook portions of the base housing so as to place the access panel in a closed state with base housing. Specifically, when inward pressure is applied from the access panel onto the base housing, the tab portions of the underside of the access panel engage with the latch clamp portions of the base housing such that the latch spring compresses and pushes the latch member into an open position for receiving the access panel. Once the flexible tabs have completely engaged the clamps, the inner spring returns to its original extended position and locks the clamp and tab portions in a fixed position, or closed state. As such, the access panel is capable of being securely fixed to the base panel tool-lessly, i.e. without the use of laborious screwing and unscrewing. If the latch has not automatically engaged in step 516, the front tabs of the access panel should be realigned with the front holes of the base housing to ensure that the hook portion is properly aligned with the clamp portions. If the access panel was successfully latched in step 516, then the battery is attached to the battery recess area of the base housing in order to conceal and protect the latch release portions of the latch members.

Several advantages are afforded by the tool-less access panel of the embodiments of the present invention. A tool-less fixture provides easier access to processing components within the base housing. For example, protection of input interfaces, such as the keyboard and touch pad, is enhanced by accessing components from the bottom side as opposed to the top side or upper surface. Furthermore, underside positioning of the access panel according to present embodiments is also more efficient as it avoids complicated electrical wiring and routing from the keyboard, touch pad, or control panel hardware, normally located on the top surface of a portable computer's base housing.

In addition, some embodiments of the prevention provide a single panel that covers an entire bottom side of the base housing, allowing for a cleaner design as well as feasibility for texture or color assignment and replacement. Furthermore, the latching mechanism according to one embodiment is protected from normal usage due to its location within the recess of the base housing and behind the removable battery.

As depicted and described in the embodiments of the present invention, the access panel is easily removed and attached to the base housing tool-lessly, or without the use of tools or other external equipment. Such a configuration allows any user, regardless of technical skill and product knowledge, to quickly access the data intensive and removable data processing components of a portable computer for servicing or upgrade.

Though the present embodiment describes a particular spring latch fastening system, the embodiments of the present invention are not limited thereto. For example, any fastening system may be used that embodies that spirit of the invention, namely tool-less access to internal and removable components of a portable computer.

While the invention has been described with respect to exemplary embodiments, one skilled in the art will recognize that numerous modifications are possible. For example, a single latch member or clamp portion may be utilized rather than multiple latches and clamps as described in the embodiments above. In addition, the latch member may be positioned anywhere around the base housing including outside the base housing. Thus, although the invention has been described with respect to exemplary embodiments, it will be appreciated that the invention is intended to cover all modifications and equivalents within the scope of the following claims.

What is claimed is:

1. A portable computer including at least one removable data processing component, the portable computer comprising:
    a base housing for accommodating the at least one removable data processing component, the base housing having a top side and a bottom side opposite the top side;
    an upper housing pivotably connected to the base housing, the upper housing having a surface that faces the top side of the base housing;
    a removable battery configured to attach to the base housing within a battery recess area of the base housing;
    at least one latch member formed within the base housing, wherein the latch member includes a clamp portion and a latch release portion exposed within the battery recess area and concealed when the removable battery is attached to the base housing; and
    an access panel having dimensions substantially similar to the dimensions of the bottom side of the base housing, wherein the access panel is configured to tool-lessly and releasably attach to the bottom side of the base housing so as expose or cover the at least one removable data processing component and the bottom side of the base housing.

2. The portable computer of claim 1, further comprising:
    at least one hook portion formed on an underneath side of the access panel, wherein the underneath side represents the side facing the at least one removable data processing component when the access panel is attached to the base housing.

3. The portable computer of claim 1, wherein upon abutting the access panel with the base housing at an aligned position, the clamp portion of the latch member is configured to automatically engage with the at least one hook portion so as to place the access panel in a closed fixed state with the base housing.

4. The portable computer of claim 1, wherein the clamp portion of the latch member is configured to automatically disengage from the book portion of the access panel upon activation of the latch release portion of the latch member.

5. The portable computer of claim 1, wherein the at least one removable data processing component represents a central processing unit, a hard drive, a wireless module, an expansion card, or memory module.

6. A method for accessing a removable data processing component stored within a chassis of a portable computer having an upper housing pivotally connected to a lower housing, the method comprising:
    removing, without the use of tools, an access panel that sufficiently spans an entire area of an underside of the lower housing so as to expose the removable data processing component;
    removing a battery from a battery storage area of the lower housing; and
    activating the latch release portion of the at least one latch member via the battery storage area,
        wherein the underside of the lower housing represents a side opposite the side facing the upper housing,
    wherein a removable battery is configured to attach to the battery storage area of the lower housing in a manner that conceals the latch member from ordinary view.

7. The method of claim 6, wherein the lower housing includes at least one latch member having a clamp portion and at latch release portion,
   wherein an underside area of the access panel facing the underside of the portable includes a hook portion configured to automatically engage the clamp portion of the latch member.

8. The method of claim 7, wherein removing the access panel comprises automatic disengagement of the clamp portion from the hook portion upon activation of the latch release portion of the at least one latch member.

9. The method of claim 7, wherein the removable data processing component represents a central processing unit, a hard drive, an expansion card, a wireless device, or memory module.

* * * * *

UNITED STATES PATENT AND TRADEMARK OFFICE
CERTIFICATE OF CORRECTION

PATENT NO.       : 8,854,810 B2                                              Page 1 of 1
APPLICATION NO.  : 13/259100
DATED            : October 7, 2014
INVENTOR(S)      : Kimbo Chen et al.

It is certified that error appears in the above-identified patent and that said Letters Patent is hereby corrected as shown below:

In the Claims,

In column 6, line 45, in Claim 4, delete "book" and insert -- hook --, therefor.

In column 7, line 3, in Claim 7, delete "at latch" and insert -- a latch --, therefor.

Signed and Sealed this
Twenty-fourth Day of February, 2015

Michelle K. Lee
*Deputy Director of the United States Patent and Trademark Office*